2,956,632

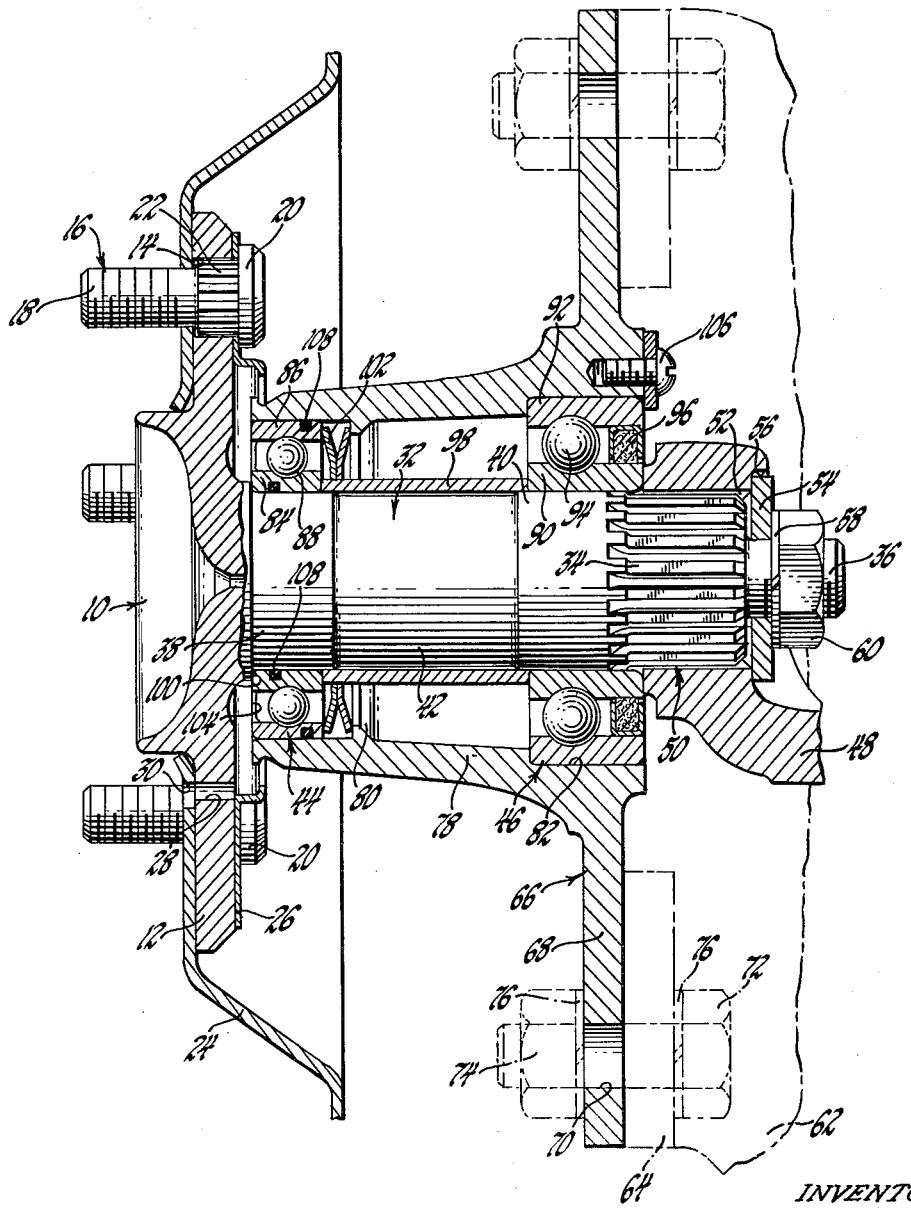

WHEEL HUB ASSEMBLY

Lothrop M. Forbush, Birmingham, Victor A. Rusnack, Grosse Pointe Woods, and Gerald Stofflet and John S. Wroby, Birmingham, Mich., assignors to General Motors Corporation, Detroit, Mich., a corporation of Delaware Filed May 7, 1959, Ser. No. 811,739

1 Claim. (Cl. 180—73)

This invention relates to a motor vehicle wheel hub assembly and more particularly to a wheel hub assembly that may be used with a DeDion type motor vehicle rear axle.

In a motor vehicle having a rear axle of the DeDion type, the usual over-all arrangement is to have a support member extending between both rear wheel hub assemblies and a pair of live axle shafts extending between the final drive of the vehicle and to each of the wheel hub assemblies. Universal joint connections are provided between the final drive and the live axle shafts and between the live axle shafts and the wheel hub spindles to allow maximum relative movement of the parts. The wheel hub and spindle, secured to the live axle shafts through the universal joint connection, is supported by the dead support member and rotatable with respect to the support member. Bearing assemblies of some suitable kind are generally provided between the spindle and the support member.

The commercially available rear axle units of the type described are generally expensive and complicated assemblies. In the wheel hubs that are known, no suitable provisions are made for giving the bearing assemblies the proper spacing on the wheel hub spindle and for providing the proper bearing preload within the unit. Without the proper bearing preload and bearing location, vibrations in the assembly result in shortened fatigue life and possible damage to the parts, as well as vibration noises that are objectionable to the vehicle user. To correct this situation, manufacturing tolerances must be held to a minimum, requiring precision machining operations and the like, making the assembly relatively expensive.

Because of the time and expense involved, the existing structures are impracticable to manufacture and assemble on a production basis in the volume necessary for present automotive manufacture.

It is here proposed to eliminate these and other objections to the usual vehicle rear axle and wheel hub assembly design. In the proposed structure the wheel hub and spindle are supported by bearings in a concentric sleeve attached to the dead supporting member, and the spindle itself is secured to the live axle shaft through the usual universal joint. The necessary spindle bearings are properly and positively spaced by a tubular sleeve and cooperating shoulders formed on the hub and spindle assembly. Bearing preload, and a certain amount of lateral adjustment, are provided by resilient means acting between the concentric support sleeve and the outboard bearing and by the universal joint connection. Lateral adjustment, along with the resilience provided, takes up any manufacturing tolerances that may be built up in the assembly, and further aids in eliminating the objectionable vibration noises. Problems of damage to the parts and problems of shortened fatigue life are greatly lessened as well.

Thus, a relatively simple and inexpensive way to obtain these and other advantages is provided, making the DeDion type of rear axle more suitable to volume production and manufacturing of present automotive industries.

The drawing illustrates a wheel hub assembly, viewed from the top and with parts broken away and in section, to illustrate the locating means and the resilient means provided for bearing location and preload, and their relation to the remainder of the wheel hub assembly.

Referring more particularly to the drawings, the flanged wheel spindle, illustrated generally by the numeral 10, has a flange portion 12 with a plurality of apertures 14 therein to receive the wheel lug bolts, illustrated generally by the numeral 16. The lug bolts are conventional in nature, comprising a threaded portion 18 and a head 20, with an externally splined shank section 22 therebetween. The splined shank cooperates with internal splines formed in the aperture 14 to prevent rotation of the lug bolt when the lug nut is tightened thereon.

A shield 24, which might also serve as a brake drum back or wheel disc, is received on the flange 12 and held in place in any suitable manner, as by the wheel and lug nuts, and serves to prevent a certain amount of dust and foreign matter from getting to the remainder of the wheel hub spindle and bearing assembly. A second dirt shield 26 is secured to the inboard side of the flange member 12 and clamped between the heads 20 of the lug bolts 16 and the flange 12, and further protects the bearing assemblies from dirt and foreign matter. An opening 28 is provided through the flange 12 and a cooperating opening 30 in the shield 24 provides a suitable drain for any water or lubricant that may pass between the shield 26 and the flange member 12, and to prevent drainage from entering the inboard side where a brake might be located.

Extending in an inboard direction from the flange 12 is a spindle portion, illustrated generally by the numeral 32, terminating in an externally splined section 34 and a smaller diametered threaded section 36. The purpose of these latter sections will be later described. The spindle 32 has a pair of cylindrical surfaces 38 and 40 of a diameter greater than the central portion 42 which serve to receive the ball bearing assemblies, illustrated generally by the numerals 44 and 46 respectively. The cylindrical surfaces 38 and 40 may be machined or ground in order to provide the correct receiving surfaces for the ball bearing members.

The splined section 34 and the threaded section 36 provide the connecting means for connecting the flanged wheel spindle 10 to the DeDion live axle (not shown). A universal yoke 48 has an opening 50 axially formed therethrough and an internal spline 52 formed in the opening 50. The internal spline 52 cooperates with the external spline 34 formed on the spindle 32, such that when the universal yoke 48 is rotated, flanged wheel spindle 10 will also be rotated. The universal yoke 48 is retained on the spindle 32 by means of a washer 54, received on a groove 56 formed in the inboard surface of the universal yoke, the washer being retained thereon by a lock washer 58 and a nut 60 received on the threaded section 36 of the spindle 32. It may thus be seen that the universal yoke is securely held in place on the spindle 32.

The DeDion dead axle, illustrated generally by the numeral 62 and shown in dashed and dotted lines in the drawing, has a pair of ears 64 extending therefrom and to which is secured the backing plate and frame member, illustrated generally by the numeral 66. The backing plate 68 has a plurality of apertures 70 formed therethrough to receive the attaching bolts 72, retained in place by the nuts 74. Lock washers 76 provide the proper retention for the bolt 72 and nut 74. The backing plate 68 is thus secured to the dead axle 62.

Extending in an outboard direction from the backing plate 68 is a sleeve member 78, concentrically disposed about the spindle 32 and radially spaced therefrom. An internal flange 80 is provided within the sleeve near the outboard end thereof, the purpose of which will be later described. An internal annular groove 82 is provided at the inboard end of the sleeve 78 and receives the ball bearing assembly 46.

The ball bearing assembly 44 has an inner race 84, received on the cylindrical section 38 of the spindle 32, and an outer race 86 slidably received within the sleeve 78 and outboard of the annular flange 80. A series of balls 88 between the inner and outer races serve to provide relatively frictionless rotation of one race with respect to the other. A seal 104 may be integral with the bearing assembly.

The ball bearing assembly 46 is of the sealed type, having an inner race 90, received on the cylindrical portion 40 of the spindle 32, and an outer race 92 received within the groove 82 formed in the sleeve 78 and secured therein by suitable clamping means, as illustrated at 106. A plurality of balls 94 provide relatively frictionless rotation of one race with respect to the other. A seal member 96 prevents the entry of dirt and foreign material to interfere with the operation of the bearing assembly.

The proper spacing for the bearing assemblies 44 and 46 with respect to the entire wheel hub assembly is provided by a tubular spacer member 98 concentrically disposed about the spindle 32 and between the spindle and the sleeve 78. The spacer member may be formed from seamless steel tubing or the like, the material being sufficient to separate the inner race 84 of the bearing assembly 44 and the inner race 90 of the bearing assembly 46 under normal conditions of load. The spacer member abuts the two bearing inner races, the opposite side of the inner race 84 abutting the shoulder 100 formed on the wheel flange member 12, to prevent movement in the outboard direction, and the inner race 90 of the bearing assembly 46 having its opposite face abutting the universal yoke 48. It may be seen that suitable clamping is provided for the location of the bearing assemblies, by the nut 60 acting on the universal yoke 48. The universal yoke abuts the inner race 90, which in turn abuts the spacer member 98 acting against the inner race 84, and the entire unit is supported by the shoulder 100 on the flange 12.

Extreme lateral loading of the flanged wheel spindle 10 is carried through cross-corners loading from inner race 90 to outer race 92 of bearing assembly 46, regardless of inboard or outboard direction of loading. In order to provide the necessary bearing preload and to aid in eliminating vibrations that would be immediately felt by the wheel hub spindle 32, the concentric sleeve 78 and the supporting axle 62, resilient means are provided between the annular flange 80, formed in the sleeve 78 and outer race 86 of the ball bearing assembly 44. The structure shown in the drawings includes a pair of back-to-back Belleville washers 102, abutting the outboard side of the flange 80 and the outer race 86 of the ball bearing assembly 44. The inner race of the bearing assembly 44 is properly located by the tubular spacer member 98 and the shoulder 100 and is axially immovable relative to the spindle. The Belleville washers 102, acting against the outer race 86, will thus bias the entire assembly, through the bearing balls 88, to reduce the vibrations occurring in the assembly. Manufacturing tolerances in the spindle 32 and the concentric sleeve 78 are thus taken up by the biasing of the spindle assembly in an outboard direction. It is conceivable that any type of spring means could be provided between the bearing assembly 44 and the annular flange 80 to provide the bearing preload and take up manufacturing tolerances.

O-ring seals 108, in the outer race 86 and in the inner race 84 of bearing 44, serve to prevent seepage of lubricant out of the annular space between sleeve 98, spindle 32 and bearing assemblies 44 and 46.

Thus a wheel hub assembly is provided which inexpensively and simply allows the proper bearing location, the correct bearing preload, and eliminates the stack up of manufacturing tolerances in the motor vehicle wheel hub assembly, eliminating objectionable vibration noises and dangers of damage.

What is claimed:

In a motor vehicle having a DeDion type axle assembly including a live driving axle and a dead supporting axle, a wheel hub assembly comprising a wheel hub having a plurality of wheel mounting lugs extending in an outboard direction therefrom, a spindle extending in an inboard direction from said hub, a universal joint connection between said hub and said live axle, a flanged member secured to said dead axle and having a sleeve extending in an outboard direction therefrom, said sleeve being concentrically disposed about said spindle, an inwardly directed radial shoulder formed from said sleeve near the outboard end thereof, a first bearing assembly disposed between said spindle and said sleeve and adjacent the inboard end of said sleeve, a second bearing assembly disposed between said spindle and said sleeve and outboard of said shoulder on said sleeve, a tubular spacer member concentrically disposed about said spindle between said spindle and said sleeve and abutting and spacing said first and second bearing assemblies on said spindle, and a pair of Belleville washer members in oppositely disposed relation and between said shoulder on said sleeve and said second bearing assembly to bias said second bearing assembly in an outboard direction and provide a suitable preload on said wheel hub assembly.

References Cited in the file of this patent

UNITED STATES PATENTS

| 1,401,349 | Miquet | Dec. 27, 1921 |
| 2,716,461 | MacPherson | Aug. 30, 1955 |

FOREIGN PATENTS

| 210,439 | Australia | June 20, 1957 |